(12) United States Patent
Erdmann et al.

(10) Patent No.: US 9,988,957 B2
(45) Date of Patent: Jun. 5, 2018

(54) VENTILATION SYSTEM FOR AN INTERNAL COMBUSTION ENGINE

(71) Applicant: REINZ-DICHTUNGS-GMBH, Neu-Ulm (DE)

(72) Inventors: Christoph Erdmann, Ulm (DE); Francesco Zitarosa, Illertissen (DE)

(73) Assignee: Reinz-Dichtungs-GmbH, Neu-Ulm (DE)

(*) Notice: Subject to any disclaimer, the term of this patent is extended or adjusted under 35 U.S.C. 154(b) by 0 days. days.

(21) Appl. No.: 15/304,106

(22) PCT Filed: Apr. 16, 2015

(86) PCT No.: PCT/EP2015/058261
§ 371 (c)(1),
(2) Date: Oct. 14, 2016

(87) PCT Pub. No.: WO2015/158819
PCT Pub. Date: Oct. 22, 2015

(65) Prior Publication Data
US 2017/0037752 A1  Feb. 9, 2017

(30) Foreign Application Priority Data
Apr. 17, 2014  (DE) .................... 20 2014 003 301 U

(51) Int. Cl.
*F01M 13/04*  (2006.01)
*B01D 45/16*  (2006.01)
(Continued)

(52) U.S. Cl.
CPC ............ *F01M 13/04* (2013.01); *B01D 45/16* (2013.01); *F01M 13/02* (2013.01);
(Continued)

(58) Field of Classification Search
CPC ........ F01M 13/00; F01M 13/02; F01M 13/04; F01M 13/0416; F01M 2013/0038;
(Continued)

(56) References Cited

U.S. PATENT DOCUMENTS 4,137,878 A  2/1979 Mineck
6,394,078 B1 * 5/2002 Kling ................... F01M 13/022
                                                    123/572

(Continued)

FOREIGN PATENT DOCUMENTS

DE       2739456 A1   3/1979
DE   102004011176 A1  10/2005
(Continued)

OTHER PUBLICATIONS

German Patent and Trade Mark Office, Cover page of earliest claimed German priority DE 20 2014 003 301 U1 with detailed listing of cited prior art, Jun. 11, 2015, 5 pages, German Patent and Trade Mark Office, Munich, Germany.
(Continued)

*Primary Examiner* — Grant Moubry
(74) *Attorney, Agent, or Firm* — Marshall & Melhorn, LLC

(57) ABSTRACT

A ventilation system for the ventilation and for the aeration of an internal combustion engine is described and depicted. The ventilation system may have an intake pipe and a supercharger in the intake pipe, and an air-oil separator for the separation of oil and/or oil mist from blow-by gases with at least one inlet and at least one outlet.

11 Claims, 7 Drawing Sheets

(51) Int. Cl.
*F01M 13/02* (2006.01)
*F01M 13/00* (2006.01)

(52) U.S. Cl.
CPC . *F01M 13/0416* (2013.01); *F01M 2013/0038* (2013.01); *F01M 2013/0044* (2013.01); *F01M 2013/027* (2013.01); *F01M 2013/0438* (2013.01)

(58) Field of Classification Search
CPC ..... F01M 2013/027; F01M 2013/0044; F01M 2013/0438; F02M 35/10222; F02M 35/10209
See application file for complete search history.

(56) References Cited

U.S. PATENT DOCUMENTS

| | | | |
|---|---|---|---|
| 6,722,129 B2* | 4/2004 | Criddle | F01M 13/022 123/562 |
| 7,523,748 B2 | 4/2009 | Hirano et al. | |
| 8,181,634 B2* | 5/2012 | Spix | F01M 13/023 123/572 |
| 8,393,315 B2 | 3/2013 | Ruppel et al. | |
| 8,695,339 B2* | 4/2014 | Spix | F01M 13/028 123/572 |
| 8,960,167 B2 | 2/2015 | Hotta | |
| 2011/0197864 A1* | 8/2011 | Karcher | F02M 25/06 123/574 |
| 2011/0308504 A1* | 12/2011 | Kobayashi | F01M 13/00 123/574 |
| 2012/0006306 A1 | 1/2012 | Boehm et al. | |

FOREIGN PATENT DOCUMENTS

| | | |
|---|---|---|
| DE | 202004011882 U1 | 12/2005 |
| DE | 102004037157 A1 | 3/2006 |
| DE | 202006009537 U1 | 6/2007 |
| DE | 202006017813 U1 | 3/2008 |
| DE | 102006054117 A1 | 5/2008 |
| DE | 102006058072 A1 | 6/2008 |
| DE | 102007012483 A1 | 9/2008 |
| DE | 102008029904 A1 | 12/2009 |
| DE | 102012207829 A1 | 11/2012 |
| DE | 102012001458 A1 | 7/2013 |
| EP | 2297434 B1 | 11/2011 |
| EP | 2182185 B1 | 3/2013 |
| WO | 2008041113 A2 | 4/2008 |
| WO | 2013065112 A1 | 5/2013 |

OTHER PUBLICATIONS

European Patent Office, International Search Report with Written Opinion issued in PCT/EP2015/058261, Jun. 30, 2015, 9 pages, European Patent Office, Rijswijk, Netherlands.

* cited by examiner

VENTILATION SYSTEM FOR AN INTERNAL COMBUSTION ENGINE

BACKGROUND OF THE INVENTION

The present invention relates to a ventilation system for the ventilation and for the aeration of an internal combustion engine. Such ventilation systems are in particular used for the ventilation and the aeration of the crank case of an internal combustion engine. The present invention further relates to a cylinder head cover and an internal combustion engine, which comprise a ventilation system according to the invention.

The ventilation systems mentioned above are in particular, but not only, used for the ventilation of a crank case in internal combustion engines. In the following, the invention is therefore described using the ventilation and aeration of a crank case as an example. For environmental reasons, the blow-by gases occurring there are usually fed back, e.g. to the intake section of the internal combustion engine. To this end, the crank case is ventilated. On the other hand and also for environmental reasons, the pressure in the crank case has to be kept within very tight limits. In order to prevent from an escape of the blow-by gases to the environment, it is for instance not allowed that a positive pressure relative to the atmospheric pressure occurs in the crank case. On the other hand, the crank case pressure may not be lower than a minimum internal pressure, so that under certain operation conditions, where only a small amount of blow-by gases occurs, the crank case even needs an aeration. This means that fresh air is supplied to the crank case. The term ventilation in the sense of this invention has a double meaning. On the one hand, it relates to the release of gases from the crank case. On the other hand, it relates to the total air management in the crankcase.

An aeration of the crank case with fresh air further provides the advantage that the blow-by gases are diluted. It also helps in guiding the blow-by gases from the crank case when only small amounts of these blow-by gases occur. This is of particular importance since nitrogen oxides are present in the blow-by gases, which cause an aging of the engine oil. A controlled aeration of the crank case therefore also slows down the aging of the engine oil.

The ventilation of the crankcase in the same way as its aeration need not be realized immediately at the crank case. Rather, the blow-by gas may be guided e.g. through the cylinder head and the cylinder head cover for different reasons. In this case, these parts, such as cylinder head and cylinder head cover, are in fluidic communication with the inner space of the crank case. It is then also possible to vent the blow-by gases from the cylinder head or the cylinder head cover for the ventilation. The aeration may be realized via the cylinder head cover or the cylinder head or via another part in fluidic communication with the crank case, too.

The pressure conditions both in the crank case and in the intake section strongly depend on the respective operational condition of the internal combustion engine. The operational condition of an internal combustion engine may, as an example, in particular be distinguished between the two states full load condition and partial load condition. Several criteria are suited in order to distinguish between full load operational condition and partial load operational conditions, each of which can be used dependent on the requirements given. It is for instance possible to distinguish the full load operational condition as operation with maximum torque and partial load operational condition as idle operation. A further possible criterion of distinction is that under full load operation, the throttle flap is completely opened, while under partial load operation, it is completely closed or only slightly or partially opened. A further possible criterion is that the supercharger of the engine is active under full load operation condition.

For these different pressure conditions of the internal combustion engine as a whole, it has to be provided that the ventilation and aeration of the crank case maintains the pressure conditions in the crank case within the limits allowed and that further, the occurring blow-by gases are guided to the intake line to a sufficient degree.

It is further necessary that the ventilated blow-by gases additionally are cleaned from oil mist and oil droplets prior to being fed back into the intake section.

For this reason, in the state of the art, for the different pressure conditions under partial load and full load, one uses ventilation devices which in sections are separated. In particular, different air-oil separators are provided, which each free the blow-by gases of the internal combustion engine from oil mist and oil droplets either under partial load or under full load conditions.

The duplicate arrangement both of the parts required for the ventilation and of the parts required for the aeration, such as air-oil separator, blow-by bypass around the air-oil separator, draining devices, outlets, pipings and the like causes that in the state of the art, a plurality of parts is required for the crank case ventilation and crank case aeration. This results in high tooling expense for the production of these parts, a high mounting expense both with the producer and at the final installation and a very large number of tubes. The cost related to this is therefore considerable, too.

Such a state of the art is for instance illustrated in DE 20 2004 011 882 U1. In this state of the art, a crank case is connected with an air-oil separator and a resonator space. Starting from the resonator space, two tubes lead to the intake section of the engine where one of the tubes opens out ahead of a turbocharger with respect to the flow direction of the fresh air and the other one of the tubes opens out downstream of the turbocharger in the intake section of the combustion engine.

In this state of the art, the aeration of the internal combustion engine is realized via an aeration line, which behind the turbocharger branches off from the intake section and leads into the cylinder head.

SUMMARY OF THE INVENTION

It is therefore the object of the present invention to provide for a ventilation system for the ventilation and the aeration of an internal combustion engine, which comprises an optimized demand in installation space, optimized cost, a reduced amount of components, a simplified and reduced mounting expense, reduced tooling cost and reduced tooling complexity and/or an increased depth of integration. It is further an object of the present invention to provide for a cylinder head cover and an internal combustion engine with such a ventilation system.

This object is solved by a ventilation system, the cylinder head cover as well as by the internal combustion engine, as defined herein.

According to the invention, a ventilation system is provided which is suited for the ventilation and aeration of an internal combustion engine. It in particular serves for the ventilation of blow-by gases and finally for the aeration of an internal combustion engine, where no immediate connection between the ventilation system and the crank case is required. The ventilation system may also be used distanced to the crank case and ventilate a different part of the internal combustion engine and—if required—may aerate a further different part or the same part of the internal combustion engine, provided that the respective part is in fluidic connection with the crank case. This way, it is possible integrate the ventilation system according to the invention, e.g. completely into a cylinder head cover, if the blow-by gases are guided from the crank case to the cylinder head cover. The present invention therefore also relates to a cylinder head cover designed accordingly and to an internal combustion engine which comprises a cylinder head cover designed accordingly or a ventilation system designed accordingly, respectively.

According to the invention, the ventilation system comprises an air-oil separator for the separation of oil and/or oil mist from blow-by gases. This air-oil separator comprises at least one inlet and at least one outlet. However, the outlet may also be divided into two or comprise several partial outlets. In the following, only one outlet is described. However, as will become clear from the drawings, the pipings connected to the air-oil separator may also be connected to divided inlet or outlet sockets. The different terms tube, piping, line and pipe are used in this application not to distinguish between the properties of the respective connecting elements, e.g. whether they are rigid tubes or flexible hoses, but only to distinguish between different functions.

The inlet of the air-oil separator is connected to a feeding pipe for blow-by gases, via which the blow-by gases are fed to the air-oil separator. The outlet (or the outlets) is (are) further connected in two ways with the intake section of the internal combustion engine. On the one hand, the outlet (or one of the partial outlets) of the air-oil separator is connected with the intake section of the internal combustion engine ahead of the supercharger with respect to the flow direction of the fresh air taken in. On the other hand, the outlet (or one of the partial outlets) via a second tube is connected to the intake section of the internal combustion engine behind the supercharger with respect to the flow direction of the fresh air taken in, in particular behind the restriction of the stream of fresh air, in particular via a throttle flap. As superchargers, e.g. compressors or exhaust turbo chargers are used in engine technology. The present invention is however not limited to these examples.

Other than in the above-mentioned state of the art, DE 20 2004 011 882 U1, two aeration pipes are provided now in the present invention. The first aeration pipe connects the first tube, which ahead of the supercharger opens out into the intake line, with the part to be aerated. Further, a second aeration pipe is provided, which connects the second tube, which opens out into the intake line behind the supercharger and the restriction of the stream of fresh air, e.g. behind the throttle flap, with the part. Both pipes serve for the aeration of a part which is in fluidic communication with the inner space of the crank case. This can be the same part as the one from which the blow-by gases are guided to the air-oil separator or a different part. In each case, the crank case, the cylinder head or the cylinder head cover come into consideration.

The invention has the advantage that the number of components is considerably reduced and therefore the complexity of the tooling and the amount of tools required, too. This is particularly advantageous if all elements described are integrated into the cylinder head cover. Further, a pre-mounting of the entire ventilation system is possible, so that the expense for the final installation is reduced. In total, in a cylinder head cover, which integrates the air-oil separator, the first tube, the second tube, the first aeration pipe and the second aeration pipe, a high cost advantages is achieved compared to the solutions in the state of the art.

According to the invention, the first tube, the second tube, the first aeration pipe and the second aeration pipe are designed in such a way that under a first operational condition, in particular under full load condition, the blow-by gases flow from the outlet (or one of the partial outlets) of the air-oil separator via the first tube to the intake section ahead of the supercharger with respect to the flow direction of the fresh air and gases from the intake section flow via the second tube, thus behind the supercharger and via the second aeration pipe to the part to be aerated. Under full load condition, this means that the vacuum given ahead of the supercharger is used for the ventilation of the crank case and the second tube and the second aeration pipe are used in order to use the high pressure in the intake section behind the supercharger to aerate an engine component, in particular to effectively aerate the crank case.

According to the invention, the ventilation is further designed in such a way that under a second operational condition, in particular under partial load operational condition of the internal combustion engine, blow-by gases flow from the outlet (or one of the partial outlets) of the air-oil separator via the second tube to the intake section behind the supercharger and the throttle flap with respect to the flow direction of the fresh air and that gases from the intake section are guided via the first tube and the first aeration pipe to the part. Under this operational conditions, as the supercharger does not build up an overpressure, the vacuum present in the intake section behind the throttle flap is used in order to ventilate the part and therefore the crank case. At the same time, the first tube and the first ventilation pipe are used to make use of the pressure given in the intake section ahead of the supercharger with respect to the flow direction of the fresh air in order to aerate the part and finally also the crank case.

As described before, the gases to be guided for the aeration and the gases to be guided for the ventilation under two different modes of operation of the internal combustion engines are guided differently. In particular, the two modes of operation are characterized in that under the first mode of operation, the internal combustion engine provides a higher performance than under the second mode of operation. In this context, it is particularly advantageous if the first mode of operation is a full load operational condition and the second mode of operation is a partial load operation condition, e.g. idle operation or coasting operation. The definitions given above for full load operation and partial load operation condition may here be alternatively applied. A further variant of the definition of the first mode of operation and the second mode of operation is given in claim 4 by actual pressure conditions in the internal combustion engine. The pressure conditions given in claim 4 always relate to the outside pressure as the reference pressure, in particular to the atmospheric pressure as the reference pressure.

With the two additional aeration pipes, which connect the first tube and the second tube as aeration line with a part to be aerated, the two tubes in the two different load conditions of the engine can be used differently. Under full load operation, the first tube serves for the ventilation and the second tube serves for the aeration, while under partial load operation, the second tube serves for the ventilation and the first tube for the aeration. As a consequence, it is possible to realize the ventilation as well as the aeration in all operation modes of the internal combustion engine with a smaller amount of parts and pipings.

As a particular advantage, only one air-oil separator is required, which in all operational states of the internal combustion engine provides for a sufficient separation of oil mist and oil droplets from the blow-by gases of the internal combustion engine.

Thus, in total, the number of parts is reduced, which results in a smaller installation space, reduced cost, reduced expense in mounting, a reduced number of tools and a reduced complexity of the tools and as a consequence, an increased depth of integration.

For the control of the different fluid streams under the first load condition and under the second load condition, valves and/or throttles may be inserted into the respective tube or pipe. Advantageously, a first valve is installed into the first tube, ahead of the branching of the first aeration pipe with respect to the flow direction of the gas under the first operational condition, which valve opens at a pressure different between the outlet of the air-oil separator and the intake section ahead of the supercharger of >0 bar. This means that the valve opens under the first operational condition so that the first tube serves for the ventilation of the cleaned bow-by gases under the first operational condition.

Further, a second valve may be arranged in the second tube ahead of the branching from the second aeration pipe with respect to the flow direction of the gas under the second operational condition, which valve opens at a pressure difference between the outlet of the air-oil separator and the intake section behind the supercharger of >0 bar. This way the valve opens under the second operational condition if a vacuum of the intake section relative to the outlet of the air-oil separator is given, so that the second pipe serves for the ventilation of the air-oil separator.

Further, a first aeration valve can be arranged in the first aeration pipe behind the branching of the first tube, which then is open if the above-mentioned first valve is closed and which is then closed if the first valve is open. With this, one achieves that, if the first tube serves for the ventilation, the first aeration pipe is closed and thus the cleaned blow-by gases are not simultaneously guided from the air-oil separator past the intake section directly in the direction of the crank case.

In a corresponding way, a second aeration valve can be arranged in the second aeration pipe behind the branching from the second tube, which is open if the second valve is closed and which is closed if the second valve is open. This way, it is prevented that under the second load condition starting from the outlet of the air-oil separator, the cleaned blow-by gas is guided via the second aeration pipe in the direction of the crank case.

The valves mentioned therefore advantageously operate without pre-tension and at the occurrence of the respective individual pressure conditions switch simultaneously or essentially simultaneously.

Further, pressure control devices can be installed into the lines. Throttles, pressure control valves, orifices or other pressure control devices are suited as pressure control devices. They are used in order to control the pressure in the crank case in such a way that the required conditions are maintained under all operational modes of the internal combustion engine. As the pressure in the crank case can be determined by the intake vacuum and the pressure of the blow-by gases, a suited setting of the pressure in the crank case can be achieved by corresponding pressure control devices in the various tubes or pipes. In particular, pressure control devices in the second tube and in the second aeration pipe are suited for this.

Advantageously, the air-oil separator of the ventilation system shows a passage of the blow-by gases not only under full-load operational condition, but also in each other operational state, in particular under partial-load operational conditions. This way, a secure ventilation of the blow-by gases and a secure separation of oil mist and oil droplets from the blow-by gases is guaranteed.

A separator for oil mist and oil droplets which comprises at least one separation element with a separator housing is particularly suited for the ventilation system according to the invention. Between its inlet and its outlet, the housing at least in sections shows the shape of a frustrum of a cone. The base of this frustrum of a cone at least in sections is closed by an elastic membrane, which is designed in such a way that it can roll up- and downwardly on the inner side of the frustrum of cone at least in sections. In the area of the housing designed as a frustrum of a cone, openings, to be more precise passage openings, are provided, which connect the inner space of the area shaped as a frustrum of a cone with the outer space and this way constitute outlets. Dependent on the pressure conditions between the inner space of the area shaped as a frustrum of a cone and the outer space on the opposite side of the elastic membrane, these outlets can be closed or released by the elastic membrane in that the membrane unrolls on the inner side of the area of the housing shaped as a frustrum of a cone. With a high pressure difference between the blow-by gases and a reference space, the elastic membrane will withdraw to a large extent from the area shaped as a frustrum of a cone and this way will release the passage openings given in this area. The higher the pressure difference, the larger the share of the area shaped as a frustrum of a cone that will be released. The reference space is most often the environment of the air-oil separator, so that the reference pressure corresponds in most cases to the atmospheric pressure. If the passage openings are arranged one behind the other in the direction of the central axis of the area shaped as a frustrum of a cone, then with an increasing pressure difference, an increasing release of further passage openings takes place. This way it is possible that even high blow-by gas flows are securely led through the air-oil separator. Further, with a small blow-by gas flow and small pressure difference—now between the inner space of the air-oil separator and the outlet space on the opposite side of the passage openings on the one hand and the reference space on the other hand—the moveable membrane is rolled down to a large extent on the inner side of the area shaped as a frustrum of a cone and therefore, most of the passage openings are closed.

Advantageously, the moveable membrane can however not roll downwardly to such an extent that all passage openings are closed. This way, it is ascertained that in each case a ventilation of the crank case takes place. With this, the air-oil separator according to the invention makes it possible to do without an additional bypass. This type of air-oil separator thus does not only serve as a separator, but at the same time has a valve function, as will be further described later on.

The separation of the oil mist and of the oil droplets here takes place in the passage openings during the passage of the blow-by gases. Due to the restriction of the gas flow and the abrupt enlargement at the end of the passages as well as because of the pressure drop along the passages, the oil droplets and the oil mist are separated. It is however also possible to arrange additional auxiliary oil-separation elements into one, several or all passages for an increase of the degree of separation.

The separation element of the air-oil separator according to the invention thus for instance comprises a housing which defines an inner space and encloses this inner space. This inner space comprises a pressure-sided inlet; further, at least one passage opening is given in the wall of the housing, which connects the inner space with the outside and in which oil and oil mist are separated during the passage of the blow-by gases. According to the invention, the air-oil separator now comprises an elastically moveable membrane, which dependent on the inner pressure given in the inner space and a reference pressure is able to close and open the at least one opening. Each deliberate pressure can be chosen as the reference pressure, but in particular the atmospheric pressure. Dependent on the pressure in the inner space being higher than the reference pressure or lower than the reference pressure, the opening is opened or closed, so that the pressure in the inner space can never rise above the reference pressure.

With a suitable choice of the reference pressure, this makes it therefore possible that the inner space always shows a determined pressure below or in the range of the reference pressure.

As the elastic membrane, a rolling membrane, which on its first side points towards the inner space and which on its other side is exposed to the reference pressure. It is arranged in such a way that it can unroll on the inner side of the housing. When rolling downward, the outlet openings given in the wall of the housing are then covered. When the membrane rolls upward, the opening is released so that the passage is opened.

A rolling membrane has the advantage that only a small lifting force is required in order to release an opening which has been closed beforehand. In particular, the switching point of the membrane for opening and closing is almost identical. The rolling behavior of the membrane is influenced by a suiting choice of the thickness of the membrane as well as of the material, e.g. fluorosilicon rubber (FVMQ), silicone rubber (VMQ), fluororubber (FKM), Epichlorohydrin rubber (ECO), polyacrylics such as alkyl acrylate rubber (ACM) and ethylene acrylic rubber (AEM), nitrile-butadiene rubber (NBR) or hydrated nitrile-butadiene rubber (HNBR), of which the membrane consists or which the membrane contains. Its elasticity, pliability or also its tendency to adhere on the inner side of the housing influence the opening and closure process. So do the geometry of the membrane and of the housing. The stiffness of the membrane can have an influence as it can dampen the rolling behavior, it may in particular lead to a delay of the beginning of an unrolling process.

It is particularly advantageous if the housing of the separation element, at least in sections, shows the shape of a frustrum of a cone. The membrane may as well be produced with the shape of a frustrum of a cone or of a cone. In this case, it is possible to close the base of the frustrum of cone of the housing with the membrane, so that the membrane can roll downward on the inner side of the housing in the direction of the tip of the cone or frustrum of cone, respectively. During this rolling process, outlet openings that may be given in the wall of the housing are then closed.

The opening angle of the frustrum of a cone advantageously amounts to between 0° and 90°, preferably to between 35° and 55°, and particularly advantageously to about 45°.

The housing shaped as a frustrum of a cone in a particularly advantageous embodiment is not only realized as one piece, but from several pieces, in particular from two pieces. In this case, it can for instance comprise two shells of the housing, which as are realized as frustra of coni and can be put one into the other. The outlet openings of the individual shells relating to each other can be realized differently, so that it becomes possible to design outlet openings passing through both shells differently with respect to their passage direction. In the simplest embodiment, they have two sections of different design, each in a separate shell. The outer shell of such a two-shell construction may for instance be produced as one-piece with the remainder of the housing, while the second, inner shell is inserted into the outer shell as a separate part. In this respect, only one of the shells needs to be one-piece, the other one(s) may consist of a circumferential frustrum of a cone or of strips running parallel to the direction of the central axis of the cone or transverse to the latter. It is preferred if the additional parts of shells comprise the same openings as the shell produced as one piece or that the openings are flush with the openings in the one-piece shell.

Advantageously, it is possible to provide the membrane with a pre-tension, which keeps the membrane either closed if the inner pressure in the housing and the reference pressure are equal or open if the resulting pressure of the inner pressure and the outlet-sided pressure—on the opposite side of the passage openings—on the one hand and the reference pressure are equal. In order to introduce such a pre-tension to the elastic membrane, a resilient element, in particular a resilient spring can be used, which exerts a tension or pressure force to the membrane. The housing with the valve thus here acts as a valve, too.

If the pressure resulting from the pressure in the inner space and the pressure on the opposite side of the passage openings is lower than (exceeds) the reference pressure, the membrane starts to roll upward (downward), so that the inner pressure in the housing, which may also be regarded as a valve decreases (increases) and the membrane again rolls over the outlet openings until an equilibrium of forces is achieved, which is not only influenced by the pressure conditions, but by the properties of the membrane, too. This is repeated cyclically, so that under normal circumstances, the membrane rolls up and downward over the outlet openings. In this context, several outlet openings may be arranged one behind the other with respect to the rolling direction, thus in the axial direction of the frustrum of cone. This causes that the membrane, when increasingly rolling upward, opens an increasing number of openings and this way reduces the flow resistance and the pressure drop at the outlet openings. As a consequence, a further reduction of the inner pressure is possible. In particular if on the inner side, a considerably high gas flow is given, the rolling membrane may completely withdraw and release all outlet openings. These outlet openings may be designed and arranged in such a way that with an increasing opening of the valve, those openings are released which show a smaller flow resistance and pressure drop. This can be realized in that the openings opened with an in-creasing withdrawal of the membrane have a larger diameter than the openings opened at the beginning of the withdrawal of the membrane.

In the circumferential direction of the frustrum of a cone, a plurality of openings may be arranged, too. Among them, the ones having identical distance to the base of the frustrum of a cone are preferably designed identically.

For an improvement of the air-oil separation, auxiliary oil-separation elements can be integrated into one or several of the outlet openings. This way, the pressure difference between the inner side and the pressure side can even better be used for the separation of oil. The helical segments, which are for instance described in the patent application publications DE 10 2004 011 176 A1 and DE 10 2004 037 157 A1 can for instance be used as such auxiliary oil-separation elements. The disclosure of these two German patent application publication documents with respect to the shape and function of such helical segments is herewith taken up in its entirety into the present application.

The opening closest to the inlet of the valve may in particular be provided with auxiliary oil-separation elements. The openings closest to the base of the housing, thus, the openings most remote from the inlet of the valve, may be provided with auxiliary oil-separation elements with a smaller flow resistance or even completely without auxiliary oil-separation elements. This way, a bypass function is realized in the housing of the valve via the openings to be opened last.

BRIEF DESCRIPTION OF THE DRAWINGS

In the following, some examples for ventilation systems, cylinder head covers and internal combustion engines according to the invention are given. In these examples, identical or similar reference numbers are used for identical or similar elements, so that a description of these elements in cases is not repeated. The following examples comprise a plurality of characteristics of the present invention and a plurality of advantageous embodiments, often in combination with each other. Each individual one of these embodiments can however serve for the improvement of the invention if taken alone and not only in combination with further elements and properties of the respective example.

DETAILED DESCRIPTION OF THE INVENTION

Figure 1:
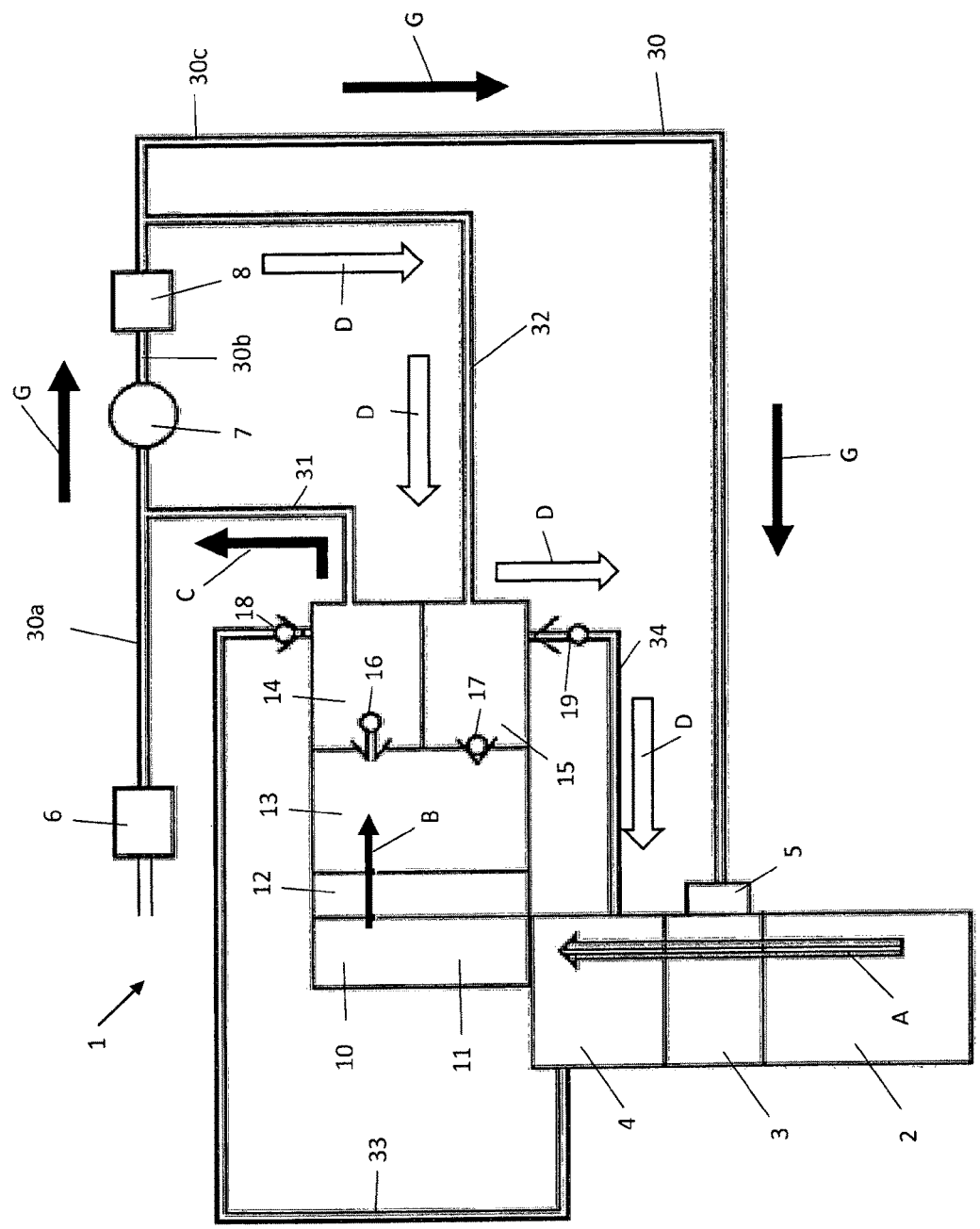
FIGS. 1 to 7 show ventilation systems and internal combustion engines according to the present invention.

FIG. 1 shows an internal combustion engine with a crank case 2, a cylinder head 3, a cylinder head cover 4 and an inlet for the aeration 5. Reference number 1 denotes a ventilation system according to the present invention.

Further, the intake section of the internal combustion engine with air filter 6, supercharger 7, throttle flap 8 and intake pipe 30 with the pipe sections 30a, 30b and 30c is shown in FIG. 1. The fresh air here is guided via the filter 6 and the pipe section 30a of the intake section to the supercharger 7. As the supercharger, one can for instance use a compressor or an exhaust turbo charger. The fresh air is guided from the supercharger to the throttle flap 8 via the pipe section 30b of the pipe 30 and from there further to the inlet for the aeration 5 via the pipe section 30c.

The ventilation system comprises an air-oil separator 10. This air-oil separator 10 comprises an inlet space 11, a separation element 12 for the separation of oil mist and oil droplets from passing gases and an outlet space 13. The outlet 13 may be considered as being already part of the pipes draining off the purified gases.

The outlet space 13 in the present FIG. 1 comprises two outlets, in each of which one one-way valve 16 or 17 is arranged, respectively. The one-way valve 16 is followed by a first space 14 and a first tube 31. The one-way valve 17 is followed by a second space 15 and a second tube 32.

The air-oil separator 10 is now connected to the intake pipe 30 via tubes 31 and 32. The first tube 31 opens out into the intake pipe 30 in its section 30a ahead of the supercharger with respect to the flow direction of the gases. The second tube 32 opens out into the intake pipe 30 in its section 30c behind the supercharger and behind the throttle flap 8 with respect to the flow direction of the gases. Starting in the space 14, an aeration pipe 33 leads further to the cylinder head cover 4. In a corresponding way, an aeration pipe 34 starting from the space 15 leads to the cylinder head cover 4, too. These aeration pipes 33, 34 are connected with the respective spaces via one-way valves 18, 19, so that the gas flow directions in these pipes can exclusively be used for the aeration of the cylinder head cover 4. The cylinder head cover 4 is in fluidic communication with the crank case 2, so that in the end the crank case can be aerated via the pipes 33 and 34.

In the present example, the gases, which are cleaned in the separation element 12, flow into an outlet space 13, which is divided into two partial spaces 14 and 15. These partial spaces 14 and 15, respectively, both functionally and structurally are already part of the first tube 31 or the second tube 32, respectively. In FIG. 1 and in the following figures, they are sometimes shown with a larger volume than the remainder of the tubes 31, 32. Such an enlarged volume is however not required, as becomes clear from FIGS. 3 to 6.

FIG. 1 now shows the internal combustion engine with the ventilation system 1 in the situation of full load operation. Under full load condition, a vacuum is given in the section 30a of intake pipe 30 ahead of the supercharger 7, while in section 30c behind the supercharger 7 and the throttle flap 8, an overpressure exists. Now, if in the space 14 as part of the first tube 31 a vacuum relative to the outlet space 13 of the air-oil separator 10 is given, then the one-way valve 16 opens and the cleaned blow-by gas can flow along arrow C through the tube 31 and then, after mixing with the fresh air coming from the air filter 6, further to the inlet for the aeration 5 along the arrows G. The overpressure which is caused by the supercharger 7 in the pipe section 30c is simultaneously charges the second tube 32 and the space 15. Because of this, the valve 17 is closed and the valve 19 is opened, so that the cylinder head cover is aerated along the arrows D via the tube 32, its partial space 15 and the pipe 34.

In FIG. 1, the flow direction of the blow-by gases from the crank case 2 via the cylinder head 3 into the cylinder head cover 4 is illustrated using the arrow A. From there, they are transferred into the air-oil separator 10 and through the inlet space 11, the separation element 12 and the outlet space 13 so that they are finally guided to the tubes 31 and 32.

Figure 2:
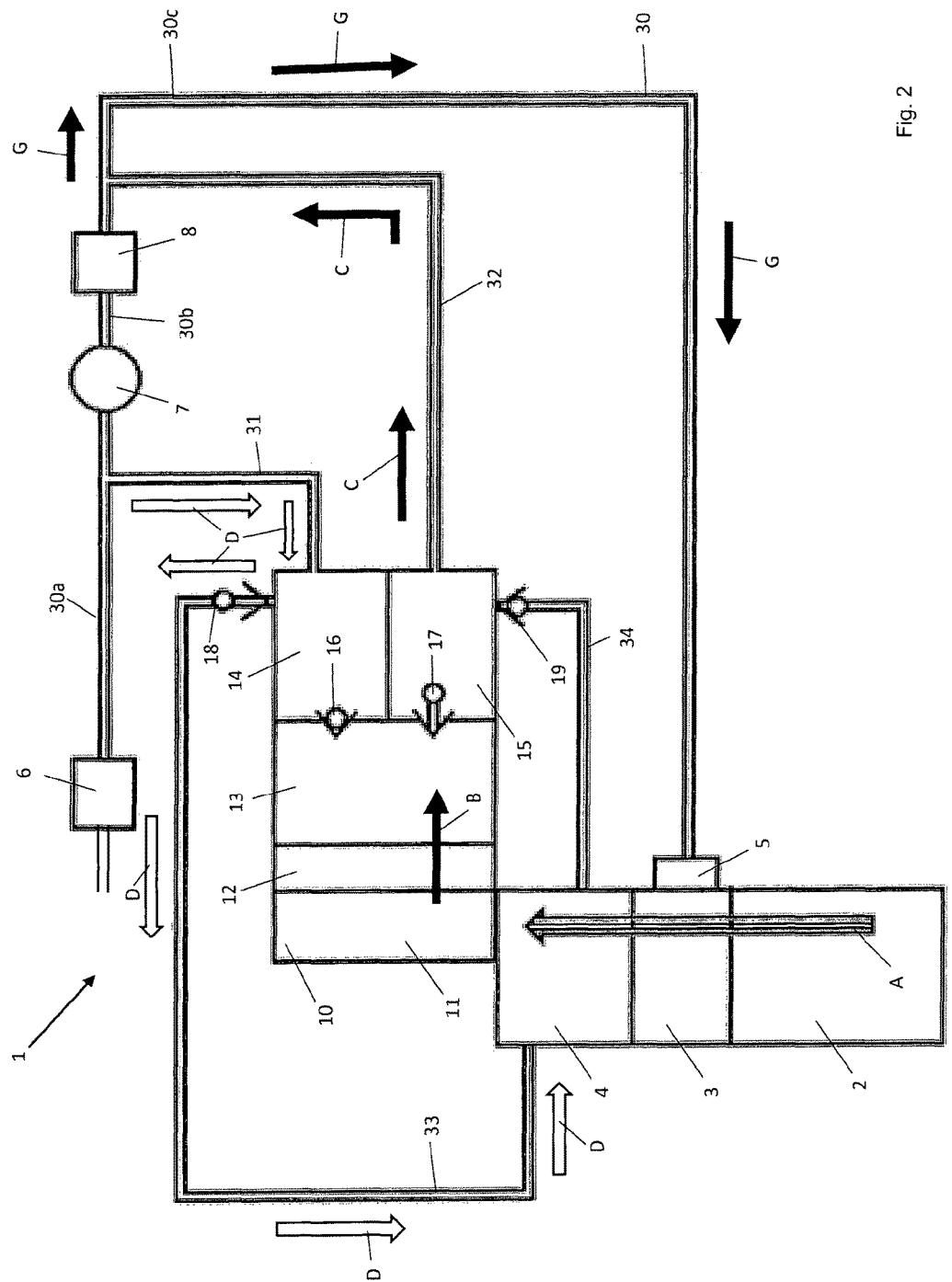

FIG. 2 shows the same internal combustion engine as it is shown in FIG. 1. However, now, the state for the partial load mode or idle mode is illustrated.

In FIG. 1 and FIG. 2 as well as in the further figures, the full load operating condition and the partial load operating condition are only examples for a first operation mode with increased load and a second operation mode with reduced engine load.

In the partial load case shown in FIG. 2, the blow-by gases are guided from the crank case 2 along the direction of the arrow A via the cylinder head 3 to the cylinder head cover 4, too, and from there enter into the air-oil separator 10.

In the partial load case, the supercharger 7 is not active, so that a strong vacuum is given behind the essentially or completely closed throttle flap 8 in the section 30c of the intake pipe 30. In contrast to this, in sections 30a and 30b a considerably smaller vacuum is given, which is larger than the vacuum given in the outlet space 13. Therefore, under the partial load operation condition shown, the valve 16 is closed while the valve 17 is opened. This causes that the blow-by gases cleaned in the air-oil separator 10 flow along arrows C through the tube 32 and then along arrows G through the pipe 30 in the direction of the inlet for the aeration 5. On the other hand, fresh air is sucked via the tube 31 from the partial section 30a of the intake pipe 30 into the space 14. As the pressure in the space 14 is higher than the crank case pressure, which propagates from the crank case 2 up into the cylinder head cover 4, the one-way valve 18 now is opened, so that the fresh air taken in through the tube 31 and the space 14 belonging to this tube is guided along arrows D through the pipe 33 into the cylinder head cover 4 for the aeration.

The valve 19 is closed, so that no gases can flow through the pipe 34.

In total the arrangement of the ventilation system according to the invention shown in FIGS. 1 and 2 causes that a reliable aeration and ventilation of parts in fluidic communication with the crank case 2 is achieved with only one air-oil separator and a small amount of lines 31 to 34, meaning a small amount of pipings, both in the partial load case and in the full load case.

In FIGS. 1 and 2, the air-oil separator is depicted as being located outside of the cylinder head cover 4.

Figure 3:
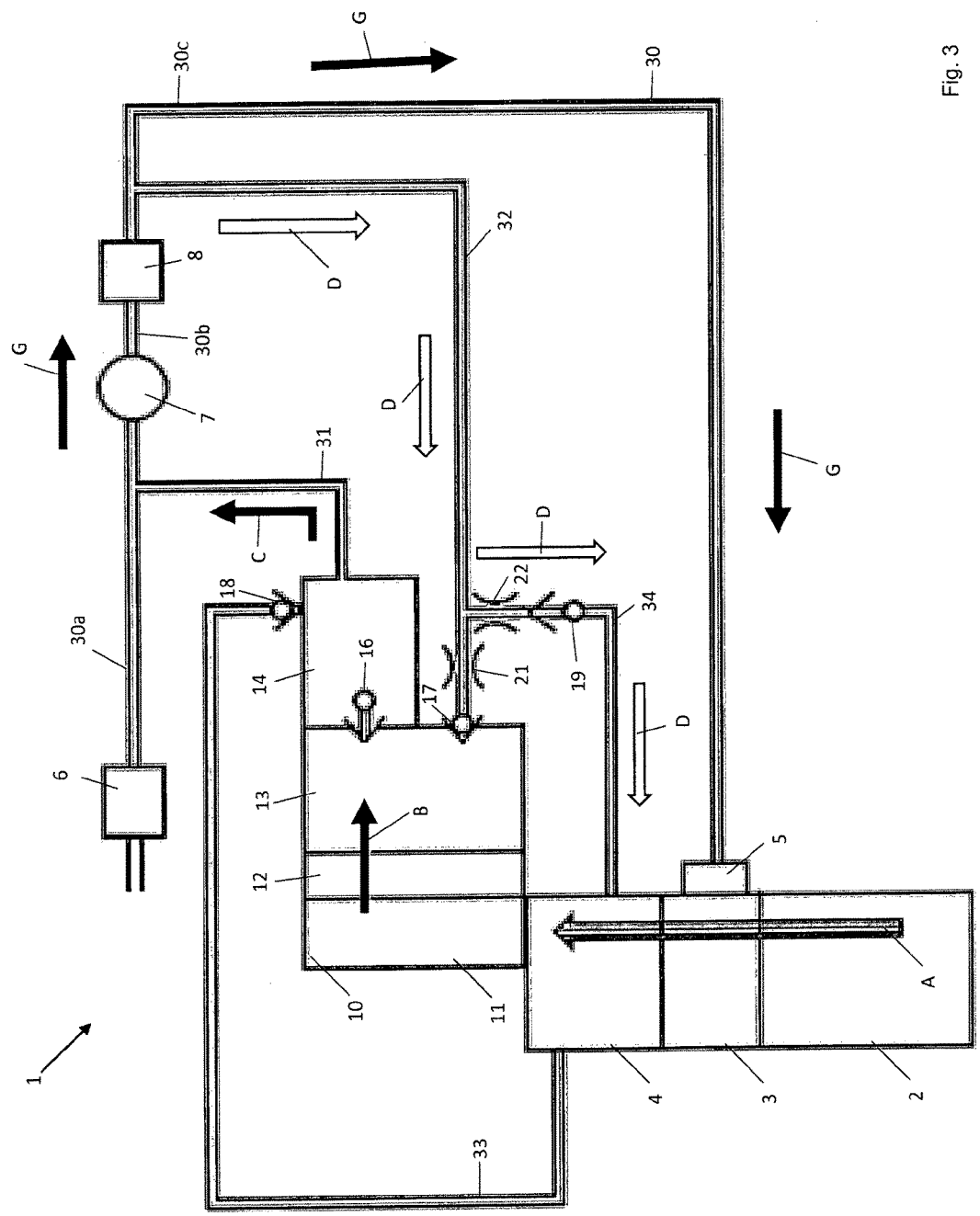
Figure 4:
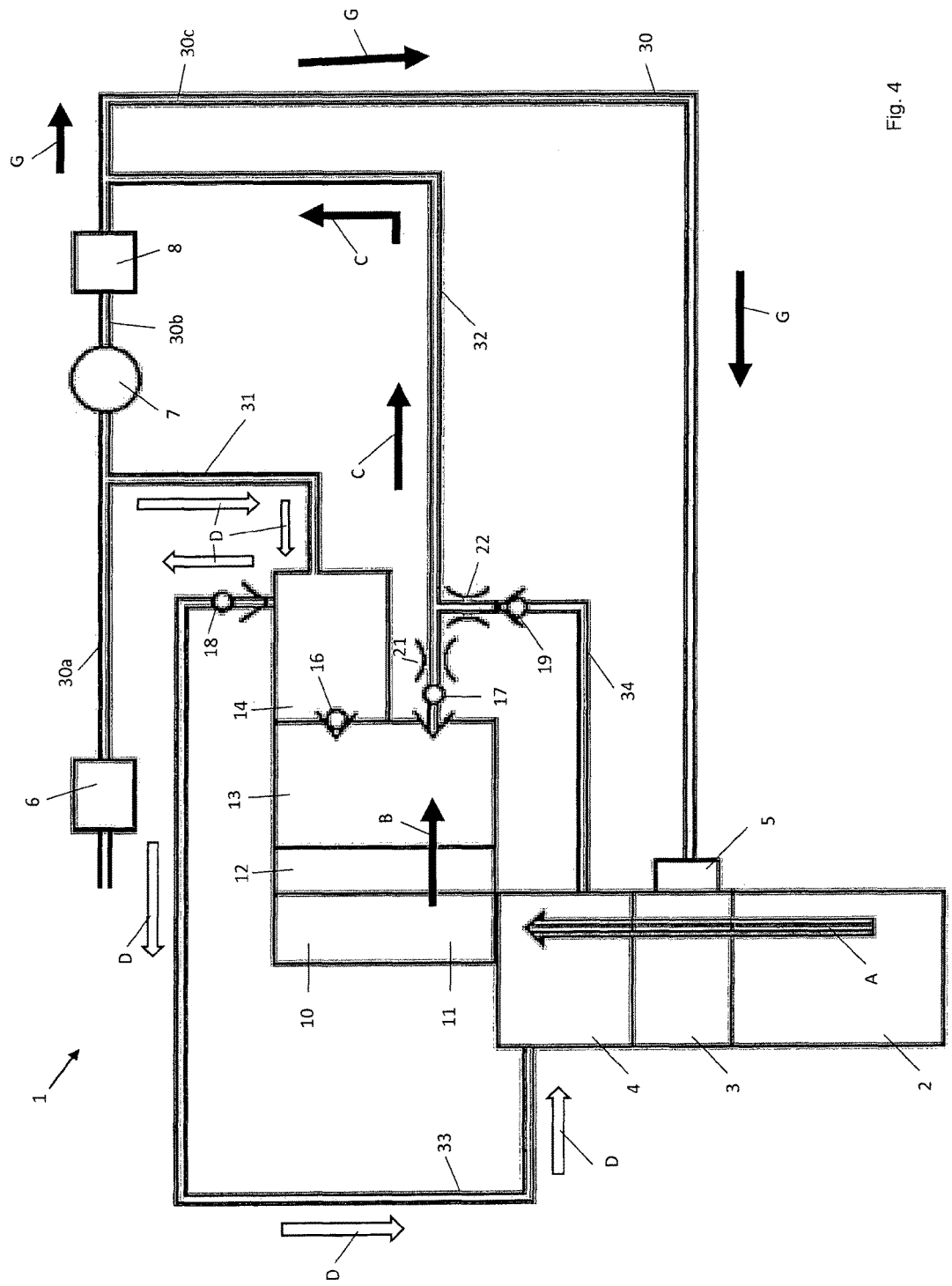

FIGS. 3 and 4 show an internal combustion engine corresponding to the one in FIGS. 1 and 2, where FIG. 3 illustrates the full load case and FIG. 4 the partial load case.

The ventilation system 1 as it is shown in FIG. 3 and FIG. 4, almost completely corresponds to the one in FIGS. 1 and 2. Other than in FIGS. 1 and 2, a throttle 21 is installed in the tube 32 ahead of the branching of pipe 34. With this throttle, under partial load condition, shown in FIG. 4, the gas flow from the outlet space 13 via the tube 32 is delimited. The throttle serves for the limitation of the vacuum in the crank case. With this, the pressure difference between the section 30c of intake pipe 30 and the outlet space 13 can be set in such a way that the pressure conditions required for the partial load case result.

Further, for the full load case, as it is shown in FIG. 3, a throttle 22 is arranged in the pipe 34 between the branching from the pipe 32 and the valve 19. This throttle delimits the amount of fresh air that flows along arrows D through the tube 32 and pipe 34 to the cylinder head cover 4 for the full load case, too.

In FIGS. 3 and 4, the tube 32 is now continuously shown starting from the valve 17 and until it flows out into the intake pipe 30. These figures do without an enlargement through a space 15 as in FIGS. 1 and 2. These figures additionally show again that the space 14 in FIGS. 1 and 2 is part of tube 31 and that the space 15 in FIGS. 1 and 2 is part of the tube 32.

Figure 5:
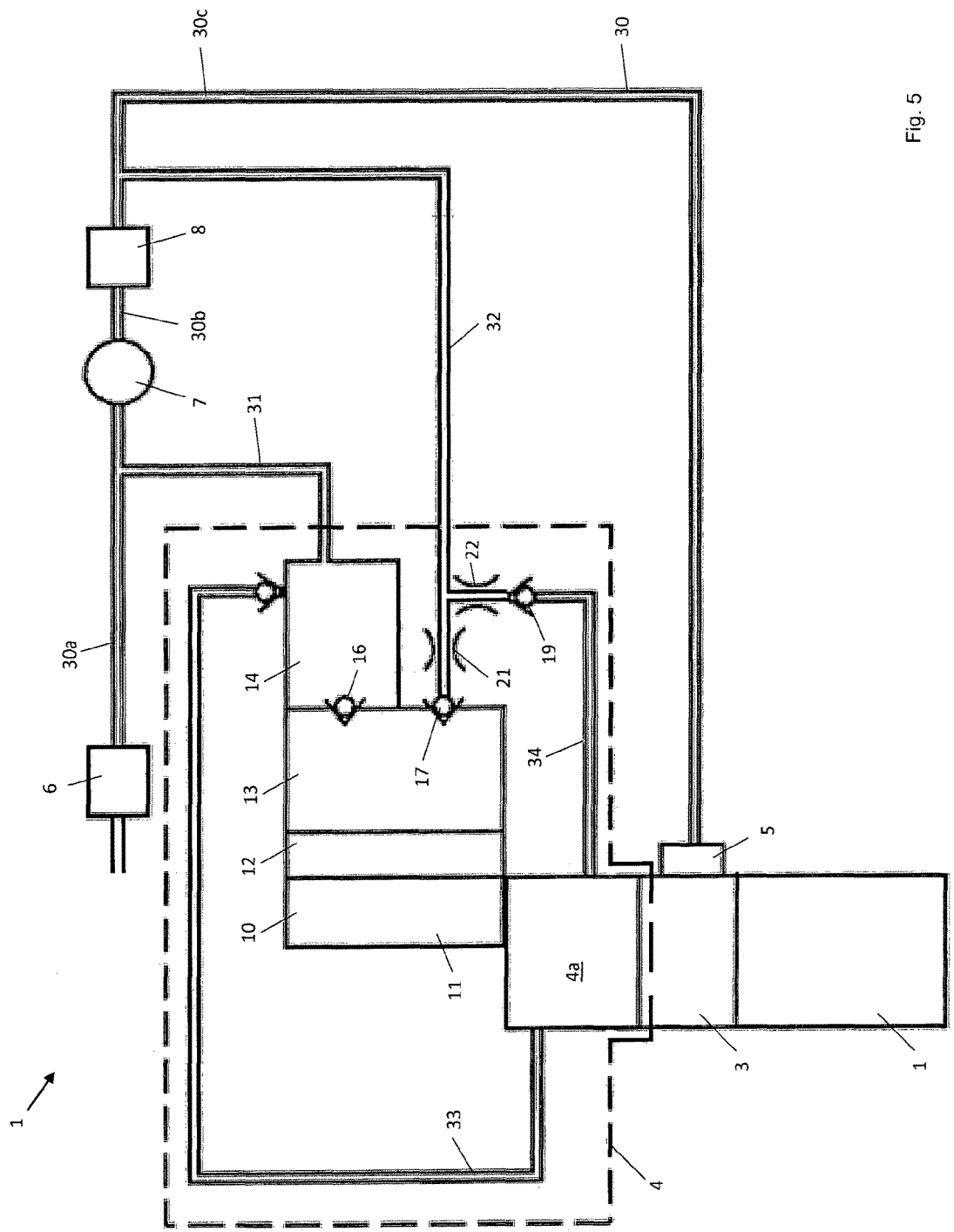

As is shown in FIG. 5, in this example the total contents of the cylinder head cover comprises all elements within the dashed line, which is referred to with reference number 4. Thus, the cylinder head cover integrates the air-oil separator 10 and further the pipes 33 and 34. In this case, the cylinder head cover 4 does not only comprise the element referred to now with reference number 4a, but also the air-oil separator 10, the spaces 14 and 15 and with this parts of the tubes 31 and 32 but also the pipes 33 and 34. With such a cylinder head cover 4, the depth of integration of an internal combustion engine is strongly increased. This further means that a considerably smaller amount of individual parts needs to be produced and later to be mounted. Overall, with this arrangement, one can in particular achieve advantages with respect to production, to the tooling expense, to the production cost as well as to the mounting expense.

Figure 6:
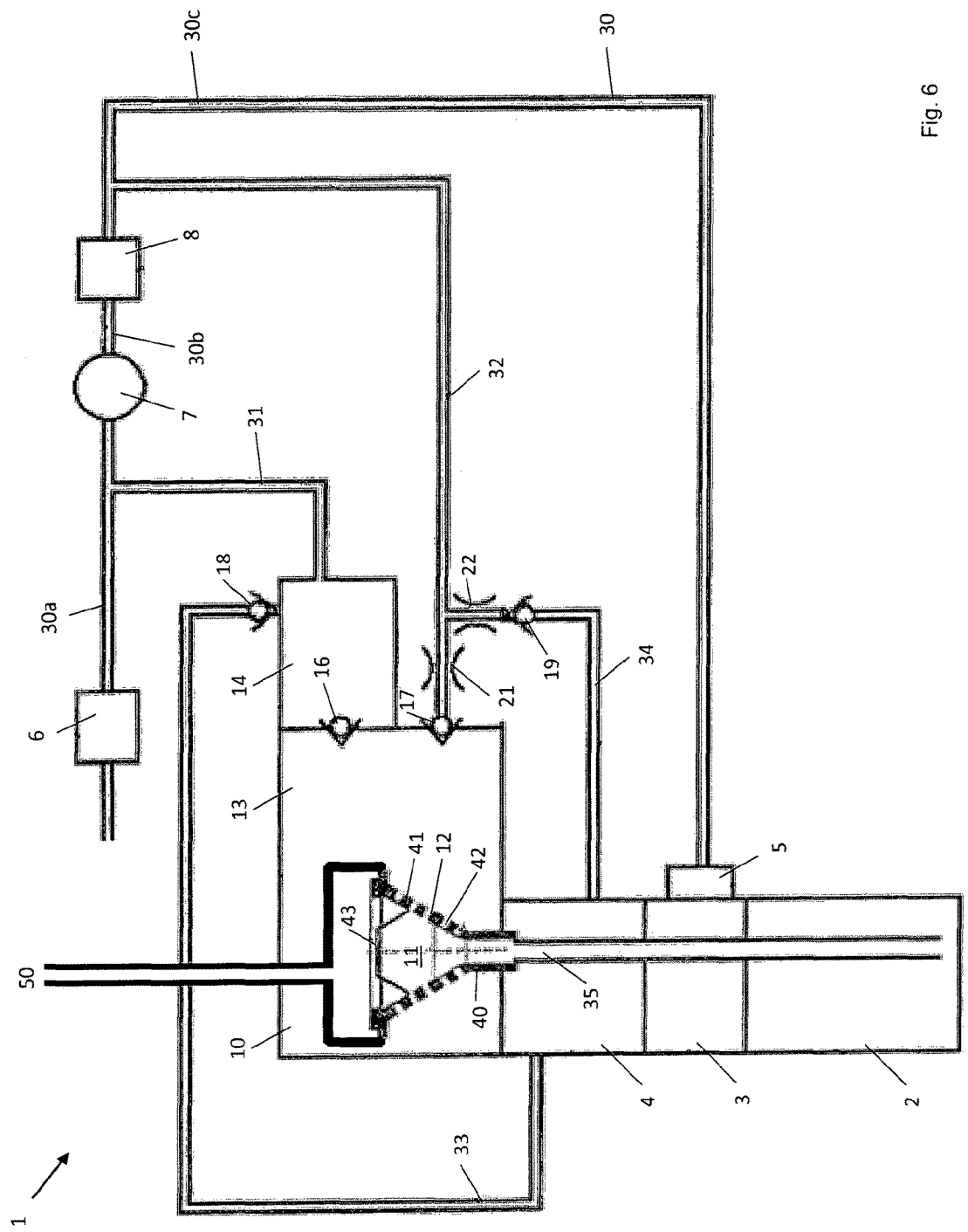

FIG. 6 shows a further internal combustion engine similar to the one in FIG. 4. The flow directions of the different gases under full load operation condition and under partial load operation condition has not be indicated here. Other than in FIG. 4, here, a specific example of an air-oil separator is illustrated.

The air-oil separator 10 comprises a separation element with a housing 40. This housing on the inlet-side is connected with a blow-by gas pipe 35, which leads from the crank case 2 through the cylinder head 3 and the valve cover 4. It shall already mentioned at this point that here, embodiments are possible where the entire air-oil separator 10 and in cases the pipes 33 and 34 are also integrated into the cylinder head cover 4.

The housing 40 now enlarges behind the inlet in conical shape and forms an inlet space 11 within the housing 4. This inlet space on the one hand is delimited by the housing 40, in particular by its conical area 41. On the other hand, a flexible membrane 43 is arranged at the housing, which spans over the enlarged end of the conical area 41 and seals this enlarged end.

Passage openings 42 are now given in the conical area 41, via which blow-by gases can stream from the inlet space 11 into an outlet space 13. In addition, a pipe is provided which connects the inner space with the outside, namely with a reference space 50 and this way exposes the upper side of the membrane 43 with the reference pressure, which in most cases corresponds to the atmospheric pressure. The further flow conditions in the ventilation system 1 according to the invention are the same ones as illustrated in FIG. 3 and FIG. 4, respectively.

During the passage through the openings 42, only one is of which referred to with a reference number in FIG. 6, oil droplets and oil mist are separated because of the pressure drop taking place there. They then collect at the bottom of the air-oil separator 10 and are then fed back to the crank case, which is neither shown here nor in the preceding examples.

Figure 7:
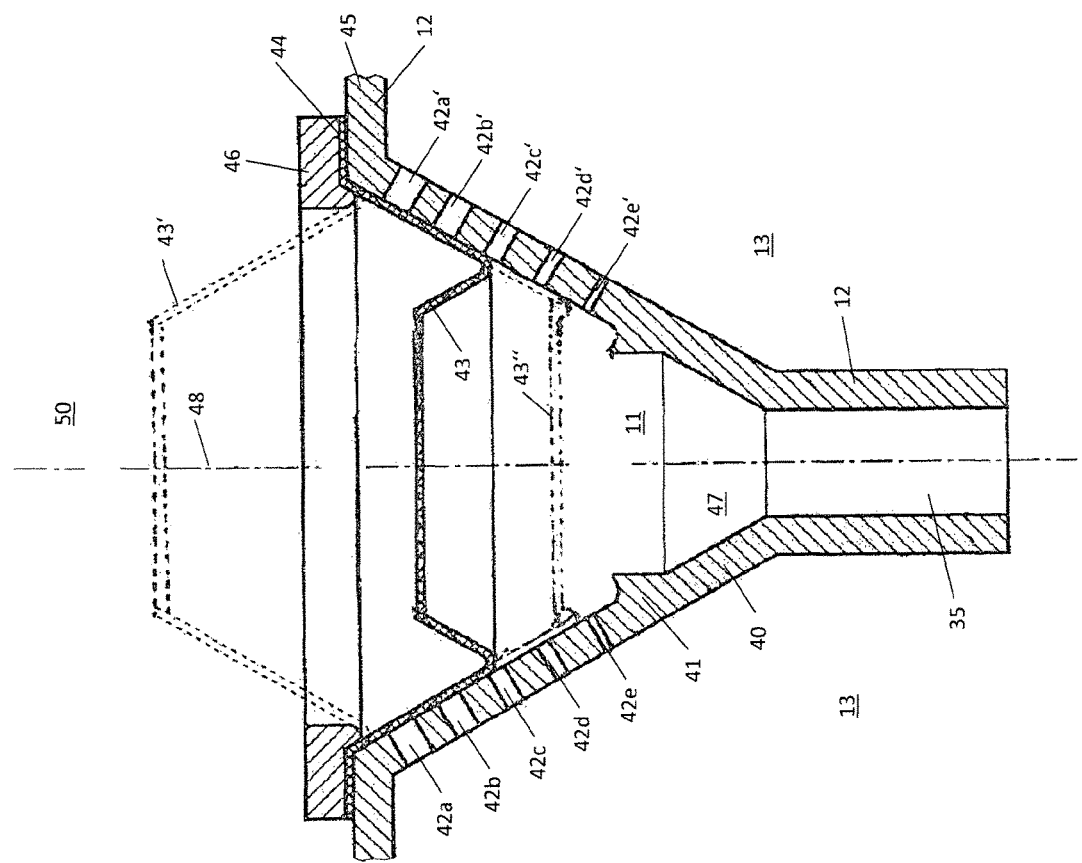

FIG. 7 now shows in a sectional illustration the separation element 12. The flexible membrane obviously is designed in such a way that it can roll up or downward along the inner wall of the conical area 41 dependent on the pressure conditions between the reference space 50, the inlet space 11 and the outlet space 13. With a considerably lower pressure in the reference space 50 relative to the inlet space 11, as it occurs for instance with large volumes of blow-by gases, the membrane 43 takes up the position 43'. It is then only maintained at the bearings 44 between an annular cover plate 46 and a flange-like enlargement 45 of the housing 40. In this position, all passage openings 42a to 42e and 42a' and 42e' depicted in FIG. 7 are released, so that a large passage cross section is available for a passage from the inlet space 11 to the outlet space 13. Nevertheless, a sufficient separation of oil mist and oil droplets is achieved in the passage openings 42a to 42e and 42a' and 42e'.

With a correspondingly small pressure difference between the outlet space 13 and the inlet space 11 on the one hand and the reference space 50 on the other hand, the membrane 43 takes up the position 43". With this, all passage openings 42a to 42d and 42a' and 42d' are covered by the membrane 43 and therefore closed. Only the outlet and passage openings 42e and 42e' furthermore remain opened and this way cause a minimum ventilation of the crank case. With the use of such a separation element 12, it is therefore not required to provide for a bypass in addition to this oil separation element.

The passage openings, which as a whole are referred to with the superordinate reference number 42, may be arranged with regular or non-regular distances along the circumference of the conical area 41 in the plane orthogonal to the central axis 48. Further, as illustrated in FIG. 7, the passage openings may also be arranged with a larger number along the conical wall 41 in the direction of the central axis 48. Overall, it is thus possible to provide the entire circumference of the conical area 41 with a plurality of passage openings 42 in a regular or non-regular manner.

In order to increase the separation performance in the openings 42, it is possible to provide them in part or all of them with additional auxiliary separation elements, e.g. with helical elements as they are described in the patent application publications DE 10 2004 011 176 A1 and DE 10 2004 037 157 A1.

The air-oil separator 10 can be adapted to the particular requirements of an engine using the amount of passage openings 42, their arrangement and their cross section as well as with the arrangement of additional auxiliary separation elements in these passage openings 42.

The invention claimed is:

1. A ventilation system for the aeration and for the ventilation of an internal combustion engine with an intake pipe and a supercharger arranged in the intake pipe, with
    an air-oil separator for the separation of oil and/or oil mist from blow-by gases with at least one inlet and at least one outlet,
    an intake pipe for blow-by gases connected to at least one of the inlets of the air-oil separator,
    a first tube for the connection of the at least one outlet of the air-oil separator with an intake section of the internal combustion engine upstream of the supercharger,
    a second tube for the connection of the at least one outlet of the air-oil separator with the intake section of the internal combustion engine downstream the supercharger, wherein
    a first aeration pipe is provided which connects the first tube with a part of the internal combustion engine and a second aeration pipe is provided which connects the second tube with the part of the internal combustion engine, and
    the first tube, the second tube, the first aeration pipe and the second aeration pipe are designed so that under a first operational condition of the internal combustion engine, blow-by gases flow from the outlet of the air-oil separator via the first tube to the intake section and that gases from the intake section flow via the second tube and the second aeration pipe to the part of the internal combustion engine and that under a second operational condition of the internal combustion engine, blow-by gases flow from the outlet of the air-oil separator via the second tube to the intake section and gases from the intake section flow via the first tube and the first aeration pipe to the part of the internal combustion engine, where the internal combustion engine under the first operational condition provides a different performance than under the second operational condition.

2. The ventilation system according to claim 1, wherein the air-oil separator comprises:
    a) a separator housing, which encloses an inner space of the separator,
    b) at least one gas inlet and one gas outlet with the outlet comprising at least one passage opening arranged in a wall of the housing,
    c) an elastically moveable membrane, which dependent on an inner pressure given in the inner space of the separator and a reference pressure closes or opens the at least one passage opening,
    with the housing at least in sections being designed with a shape of a frustrum of a cone and a base of the frustrum of the cone at least being at least partially closed by the elastically moveable membrane,
    and the elastically moveable membrane being arranged in such a way that said membrane rolls down on an inner side of the housing covering the at least one passage opening if the inner pressure in the inner space falls below the reference pressure.

3. The ventilation system according to claim 1, wherein the part of the internal combustion engine is a one- or multiple-part cylinder head cover, an engine block, an oil pan, a crankcase end cover or a crank case of an internal combustion engine or an air-oil separation module fastened to at least one of the aforementioned elements.

4. The ventilation system according to claim 1, wherein the part of the internal combustion engine comprises a crank case or that the part is a part connected or connectable with the crank case so that blow-by gases can be guided from the crank case to that part.

5. The ventilation system according to claim 4, wherein the part comprises is a cylinder head cover or a cylinder head of an internal combustion engine, with the cylinder head cover or the cylinder head being connected or connectable to the crank case in such a way that blow-by gases can be guided from the crank case to the cylinder head cover or to the cylinder head.

6. The ventilation system according to claim 5, wherein the first operational condition is a full load operational condition comprised of a substantially opened throttle flap and the first operational condition is an operation state with a pressure of 0 to 4 bar in the second tube and/or with a pressure of 0 to −60 mbar in the first tube.

7. The ventilation system according to claim 5, wherein the second operational condition is a partial load operational condition and the second operational condition is an operational state with a substantially closed throttle flap and the second operational condition is an operational state with a pressure of 0 to 750 mbar in the second pipe and/or with a pressure of 0 to −60 mbar in the first tube.

8. The ventilation system according to claim 7, wherein the second operational condition is an idle operational condition or a coasting operational condition.

9. The ventilation system according to claim 4, wherein
    a) in the first tube in a flow direction of the gas under the first operational condition upstream of a branching of the first aeration pipe, a first valve is arranged, which opens at a pressure difference between the outlet of the air-oil separator and the intake section upstream of the supercharger of >0 bar, and/or
    b) in the second tube, a second valve is arranged upstream of a branching of the second aeration pipe with respect to a flow direction of the gases under the second operational conditions, which opens at the pressure difference between the outlet of the air-oil separator and the intake section downstream the supercharger of >0 bar, and/or
    c) a first aeration valve is arranged in the first aeration pipe downstream a branching from the first tube, which first aeration valve is open when the first valve is closed and which is closed when the first valve is opened, and/or d) a second aeration valve is arranged in the second aeration pipe downstream a branching from the second tube, which second aeration valve is open when the second valve is closed and which is closed when the second valve is opened.

10. The ventilation system according to claim 9, wherein a first pressure control device is arranged in the second tube ahead of the branching of the second aeration pipe with respect of the flow direction of the gases under the second operational condition and/or that a second pressure control device is arranged in the second aeration pipe behind the branching from the second tube.

11. The ventilation system according to claim 10, wherein the first pressure control device and/or the second pressure control device is a throttle, a pressure control valve or an orifice or a combination of the throttle, pressure control valve or orifice.

* * * * *